United States Patent
Matsushita et al.

(10) Patent No.: US 12,515,983 B2
(45) Date of Patent: *Jan. 6, 2026

(54) INFRARED-TRANSMITTING GLASS

(71) Applicant: NIPPON ELECTRIC GLASS CO., LTD., Otsu (JP)

(72) Inventors: Yoshimasa Matsushita, Otsu (JP); Fumio Sato, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 1031 days.

This patent is subject to a terminal disclaimer.

(21) Appl. No.: 17/430,413

(22) PCT Filed: Feb. 21, 2020

(86) PCT No.: PCT/JP2020/007218
§ 371 (c)(1),
(2) Date: Aug. 12, 2021

(87) PCT Pub. No.: WO2020/175403
PCT Pub. Date: Sep. 3, 2020

(65) Prior Publication Data
US 2022/0144687 A1 May 12, 2022

(30) Foreign Application Priority Data
Feb. 28, 2019 (JP) .................................. 2019-035815

(51) Int. Cl.
*C03C 4/10* (2006.01)
*C03C 3/32* (2006.01)
*G01N 21/35* (2014.01)

(52) U.S. Cl.
CPC .............. *C03C 3/321* (2013.01); *C03C 3/323* (2013.01); *C03C 4/10* (2013.01); *C03C 2204/00* (2013.01); *G01N 21/35* (2013.01)

(58) Field of Classification Search
CPC ........... C03C 3/321; C03C 3/323; C03C 4/10; C03C 2204/00; G01N 21/35
See application file for complete search history.

(56) References Cited

U.S. PATENT DOCUMENTS

| 6,015,765 | A |  | 1/2000 | Harbison et al. |
| 11,919,806 | B2 | * | 3/2024 | Matsushita ........... G01J 1/0488 |
| 2016/0311719 | A1 |  | 10/2016 | Yamada et al. |
| 2018/0257977 | A1 |  | 9/2018 | Nagashima et al. |
| 2021/0053866 | A1 | * | 2/2021 | Matsushita ............. C03C 3/062 |

FOREIGN PATENT DOCUMENTS

| CN | 104402220 A |  | 3/2015 | |
| CN | 105722801 A |  | 6/2016 | |
| EP | 642870 A1 | * | 3/1995 | ............. B23K 1/203 |
| EP | 1 642 870 B1 |  | 3/2008 | |
| JP | 2017114733 A | * | 6/2017 | ................ C03C 3/32 |
| JP | 2017-124952 A |  | 7/2017 | |
| JP | 2019147723 A | * | 9/2019 | ............. G02B 5/208 |
| WO | 2017/086227 A1 |  | 5/2017 | |
| WO | 2017/110500 A1 |  | 6/2017 | |
| WO | 2017/168939 A1 |  | 10/2017 | |

OTHER PUBLICATIONS

Official Communication issued in Chinese Patent Application No. 202080009024.7, mailed on Sep. 5, 2022.
Official Communication issued in corresponding Chinese Patent Application No. 202080009024.7, mailed on Feb. 12, 2023.
Official Communication issued in European Patent Application No. 20763186.2, mailed on Nov. 9, 2022.
Official Communication issued in International Patent Application No. PCT/JP2020/007218, mailed on Mar. 24, 2020.

* cited by examiner

*Primary Examiner* — Elizabeth A. Bolden
(74) *Attorney, Agent, or Firm* — Keating & Bennett, LLP

(57) ABSTRACT

Provided is a thermally stable infrared-transmitting glass. An infrared-transmitting glass contains, in terms of % by mole, over 15 to 40% Ge, over 0 to 40% Ga, 40 to below 80% Te, 0 to 40% Si+Al+Ti+Cu+In+Sn+Bi+Cr+Sb+Zn+Mn+Cs+Ag+As+Pb, and 0 to 40% F+Cl+Br+I.

3 Claims, No Drawings

INFRARED-TRANSMITTING GLASS

TECHNICAL FIELD

The present invention relates to infrared-transmitting glasses for use in infrared sensors and so on.

BACKGROUND ART

Vehicle-mounted night vision devices, security systems, and the like are equipped with an infrared sensor for use to detect living bodies at night. Infrared sensors are devices that sense infrared rays with wavelengths of about 8 to 14 μm emitted from living bodies and are provided, in front of the sensor part, with an optical element, such as a filter or a lens, capable of transmitting infrared rays in the above wavelength range.

Conventionally, Ge or ZnSe is used as a material for the optical element as described above. However, these materials are crystalline bodies and therefore have poor workability, which presents a problem that they are difficult to work into complicated shapes, such as an aspheric lens.

To cope with the above, chalcogenide glasses are proposed as vitreous materials that can transmit infrared rays with wavelengths of about 8 to 14 μm and can be relatively easily worked into shape (for example, Patent Literature 1).

CITATION LIST

Patent Literature

PTL 1

European Patent No. 1642870

SUMMARY OF INVENTION

Technical Problem

The glass described in Patent Literature 1 has a narrow vitrification range and is thermally unstable.

In view of the above, the present invention has an object of providing a thermally stable infrared-transmitting glass.

Solution to Problem

The inventors conducted intensive studies and, as a result, found that the above problem can be solved by a glass having a particular composition. Specifically, an infrared-transmitting glass according to the present invention contains, in terms of % by mole, over 15 to 40% Ge, over 0 to 40% Ga, 40 to below 80% Te, 0 to 40% Si+Al+Ti+Cu+In+Sn+Bi+Cr+Sb+Zn+Mn+Cs+Ag+As+Pb, and 0 to 40% F+Cl+Br+I. As used herein, "(component)+(component)+..." means the total sum of the contents of the relevant components.

In an optical element according to the present invention, the above-described infrared-transmitting glass is used.

In an infrared sensor according to the present invention, the above-described optical element is used.

Advantageous Effects of Invention

The infrared-transmitting glass according to the present invention enables provision of a thermally stable infrared-transmitting glass.

DESCRIPTION OF EMBODIMENTS

An infrared-transmitting glass according to the present invention contains, in terms of % by mole, over 15 to 40% Ge, over 0 to 40% Ga, 40 to below 80% Te, 0 to 40% Si+Al+Ti+Cu+In+Sn+Bi+Cr+Sb+Zn+Mn+Cs+Ag+As+Pb, and 0 to 40% F+Cl+Br+I. The reasons why the glass composition is defined as above will be described below. In the following description of the respective contents of components, "%" refers to "% by mole" unless otherwise specified.

Ge is an essential component for forming the glass network. The content of Ge is over 15 to 40%, preferably 18 to 30%, and more preferably 22 to 25%. If the content of Ge is too small, vitrification becomes difficult. On the other hand, if the content of Ge is too large, Ge-based crystals precipitate to make infrared rays less likely to pass through the glass and the raw material cost tends to rise.

Ga is an essential component that increases the thermal stability of the glass (the stability of vitrification). The content of Ga is over 0 to 40%, preferably 1 to 30%, and more preferably 2 to 20%. If the content of Ga is too small, vitrification becomes difficult. On the other hand, if the content of Ga is too large, Ga-based crystals precipitate to make infrared rays less likely to pass through the glass and the raw material cost tends to rise.

Te, which is a chalcogen element, is an essential component that forms the glass network. The content of Te is 40 to below 80%, more preferably 50 to 79%, and particularly preferably 65 to 78%. If the content of Te is too small, vitrification becomes difficult. On the other hand, if the content of Te is too large, Te-based crystals precipitate to make infrared rays less likely to pass through the glass.

Si, Al, Ti, Cu, In, Sn, Bi, Cr, Sb, Zn, Mn, Cs, Ag, As, and Pb are components that increase the thermal stability of the glass without decreasing the infrared transmission properties. The content of Si+Al+Ti+Cu+In+Sn+Bi+Cr+Sb+Zn+Mn+Cs+Ag+As+Pb is 0 to 40%, preferably 0.1 to 20%, and particularly preferably 0.2 to 10%. If the content of Si+Al+Ti+Cu+In+Sn+Bi+Cr+Sb+Zn+Mn+Cs+Ag+As+Pb is too large, vitrification becomes difficult. The infrared-transmitting glass is preferably substantially free of As and Pb in consideration of their toxicity and environmental burden. Therefore, in the case where the infrared-transmitting glass is substantially free of As and Pb, the content of Si+Al+Ti+Cu+In+Sn+Bi+Cr+Sb+Zn+Mn+Cs+Ag is preferably 0 to 40%, more preferably 0.1 to 20%, and particularly preferably 0.2 to 10%. As used herein, "substantially free of" means that no amount of these components are deliberately contained in the raw materials, and is not intended to exclude even the incorporation thereof in impurity level. Objectively, the content of each component is preferably less than 0.1%. Furthermore, the content of each component of Si, Al, Ti, Cu, In, Sn, Bi, Cr, Sb, Zn, Mn, Cs, Ag, As, and Pb is preferably 0 to 40%, more preferably 0.1 to 20%, and particularly preferably 0.2 to 10%. Of these, the use of Ag and/or Sn is preferred because their effect of increasing the thermal stability of the glass is particularly large.

F, Cl, Br, and I are also components that increase the thermal stability of the glass. The content of F+Cl+Br+I is 0 to 40%, preferably 0 to 20%, and particularly preferably 0.1 to 10%. If the content of F+Cl+Br+I is too large, vitrification becomes difficult and the weather resistance is likely to decrease. The content of each component of F, Cl, Br, and I is preferably 0 to 40%, more preferably 0 to 20%, and particularly preferably 0.1 to 10%. Of these, I is preferably used because its elemental material is usable and its effect of increasing the thermal stability of the glass is particularly large.

The infrared-transmitting glass according to the present invention may contain, in addition to the above components, the following components.

Se, which is a chalcogen element, is a component that widens the vitrification range and increases the thermal stability of the glass. The content of Se is preferably 0 to 40%, more preferably 0.1 to 20%, and particularly preferably 0.2 to 10%. However, Se is toxic and, therefore, from the viewpoint of reducing the influences on environment and human bodies, its content is preferably 5% or less, more preferably 3% or less, and still more preferably 1% or less, and the glass is particularly preferably substantially free of Se.

S, which is a chalcogen element, is a component that widens the vitrification range and increases the thermal stability of the glass. However, if the content of S is too large, infrared rays are less likely to pass through the glass. Therefore, the content of S is preferably 0 to 40%, 0 to 20%, 0 to 10% or 0 to 4% and the glass is particularly preferably substantially free of S.

The infrared-transmitting glass according to the present invention is preferably substantially free of Cd and Tl which are toxic substances. By doing so, the influence on environment can be minimized.

The infrared-transmitting glass according to the present invention preferably does not contain devitrified matter having a length of 500 μm or more. Even if the infrared-transmitting glass contains devitrified matter, its length is less than 500 μm, preferably 200 μm or less, 100 μm or less, or 50 μm or less, and particularly preferably 10 μm or less. Thus, the deterioration in infrared transmission properties can be reduced. $Ga_2O_3$ produced by oxidation of glass during melting is likely to become devitrified matter and, therefore, it is preferred to reduce the production of the devitrified matter by a method to be described later. As used In the present invention, devitrified matter means a foreign substance present in the glass and refers to particles of unmelted raw materials or crystal precipitates and agglomerates of these particles.

In the infrared-transmitting glass according to the present invention, the infrared absorption edge wavelength at a thickness of 2 mm is preferably 15 μm or more, more preferably 20 μm or more, and particularly preferably 21 μm or more. As used in the present invention, "infrared absorption edge wavelength" refers to a wavelength at which the light transmittance reaches 10% in an infrared range of wavelengths of not less than 8 μm.

The infrared-transmitting glass according to the present invention has an excellent average infrared transmittance at wavelengths of about 8 to 14 μm. Specifically, the average internal transmittance at a wavelength of 8 to 14 μm is preferably 80% or more and particularly preferably 90% or more. If the internal transmittance is too low, the sensitivity to infrared rays becomes poor, so that an infrared sensor may not sufficiently function.

The infrared-transmitting glass according to the present invention can be produced, for example, in the following manner. Raw materials are mixed to give the glass composition described above, thus obtaining a raw material batch. Next, a quartz glass ampoule is evacuated with the application of heat, the raw material batch is then put into the quartz glass ampoule, and the quartz glass ampoule is sealed with an oxygen burner. It is sufficient that no oxygen exists in the ampoule, and an inert gas or the like may be encapsulated in the ampoule. Next, the sealed quartz glass ampoule is raised in temperature to 650 to 1000° C. at a rate of 10 to 40° C./hour in a melting furnace and then held for six to twelve hours. During the holding time, as necessary, the quartz glass ampoule is turned upside down to stir the melt.

Subsequently, the quartz glass ampoule is taken out of the melting furnace and rapidly cooled to room temperature, thus obtaining an infrared-transmitting glass according to the present invention.

An optical element can be produced by working the infrared-transmitting glass obtained in the above manner into a predetermined shape (such as a disc shape or a lenticular shape).

For the purpose of increasing the transmittance, an antireflection film may be formed on one or both sides of the optical element. Examples of the method for forming the antireflection film include vacuum deposition, ion plating, and sputtering.

Alternatively, after the antireflection film is formed on the infrared-transmitting glass, the infrared-transmitting glass may be worked into the predetermined shape. However, for the reason that the antireflection film is likely to peel off during the working process, the antireflection film is preferably formed after the infrared-transmitting glass is worked into the predetermined shape, unless the circumstances are exceptional.

Since the infrared-transmitting glass according to the present invention has an excellent infrared transmittance, it is suitable as a cover member for protecting a sensor part of an infrared sensor or an optical element, such as a lens for focusing infrared light on an infrared sensor part of the infrared sensor.

EXAMPLES

Hereinafter, the present invention will be described with reference to examples, but is not limited to these examples.

Tables 1 to 3 show Examples of the present invention and a Comparative Example.

TABLE 1

| | | 1 | 2 | 3 | 4 | 5 | 6 | 7 | 8 | 9 | 10 |
|---|---|---|---|---|---|---|---|---|---|---|---|
| Glass Composition | Ge | 16 | 17 | 18 | 19 | 20 | 21 | 23 | 25 | 30 | 35 |
| (% by mole) | Ga | 5 | 5 | 5 | 5 | 5 | 1 | 1 | 1 | 2 | 5 |
| | Ag | 5 | 5 | 5 | 5 | 5 | 1 | 1 | 1 | 3 | |
| | Sn | | | | | | | | | | |
| | I | | | | | | | | | | |
| | Te | 74 | 73 | 72 | 71 | 70 | 77 | 75 | 73 | 65 | 60 |
| Vitrification | | good | good | good | good | good | good | good | good | good | good |
| Internal Transmittance | | good | good | good | good | good | good | good | good | good | good |

TABLE 2

| | | 11 | 12 | 13 | 14 | 15 | 16 | 17 | 18 | 19 | 20 |
|---|---|---|---|---|---|---|---|---|---|---|---|
| Glass Composition | Ge | 40 | 21 | 22 | 21 | 21 | 21 | 21 | 22 | 22 | 22 |
| (% by mole) | Ga | 7 | 9 | 11 | 32 | 37 | 14 | 17 | 21 | 24 | 28 |
| | Ag | 3 | | | | | 10 | 15 | 17 | 7 | 9 |
| | Sn | | | | | | | | | 4 | |
| | I | | | | 2 | 2 | | | | | |
| | Te | 50 | 70 | 67 | 45 | 40 | 55 | 47 | 40 | 43 | 41 |
| Vitrification | | good | good | good | good | good | good | good | good | good | good |
| Internal Transmittance | | good | good | good | good | good | good | good | good | good | good |

TABLE 3

| | | 21 | 22 | 23 | 24 | 25 |
|---|---|---|---|---|---|---|
| Glass Composition | Ge | 21 | 21 | 21 | 21 | 11 |
| (% by mole) | Ga | 2 | 2 | 2 | 1 | |
| | Ag | 22 | 26 | 32 | 37 | 49 |
| | Sn | | | | 1 | |
| | I | 15 | 11 | 5 | | |
| | Te | 40 | 40 | 40 | 40 | 40 |
| Vitrification | | good | good | good | good | poor |
| Internal Transmittance | | good | good | good | good | — |

Each sample in Examples 1 to 24 and Comparative Example 25 was prepared in the following manner. A quartz glass ampoule was evacuated with the application of heat and a raw material batch formulated to give each glass composition shown in the tables was then put into the quartz glass ampoule. Next, the quartz glass ampoule was sealed with an oxygen burner. Thereafter, the sealed quartz glass ampoule was raised in temperature to 650 to 1000° C. at a rate of 10 to 40° C./hour in a melting furnace and then held for six to twelve hours. During the holding time, the quartz glass ampoule was turned upside down to stir the melt. Subsequently, the quartz glass ampoule was taken out of the melting furnace and rapidly cooled to room temperature, thus obtaining a sample.

Each of the obtained samples was subjected to X-ray diffraction and, based on its diffraction spectrum, whether the sample became vitrified was confirmed. In the tables, vitrified samples are represented to be "good", whereas unvitrified samples are represented to be "poor".

Furthermore, each sample was measured in terms of internal transmittance. With regard to the internal transmittance for each sample, the sample polished with a thickness of 2 mm±0.1 mm and the sample polished with a thickness of 10 mm±0.1 mm were each measured in terms of transmittance including surface reflectance loss and their internal transmittances at a wavelength of 8 to 14 μm were calculated from the obtained measured values. Samples having an average internal transmittance of 80% or more are represented to be "good", whereas samples having an average internal transmittance of less than 80% are represented to be "poor".

As shown in the tables, the samples in Examples 1 to 24 were confirmed to become vitrified. Furthermore, these samples had an internal transmittance as high as 80% or more at a wavelength of 8 to 14 μm and thus exhibited good infrared transmission properties.

On the other hand, the sample in Comparative Example 25 was not vitrified and its internal transmittance at a wavelength of 8 to 14 μm could not be measured.

INDUSTRIAL APPLICABILITY

The infrared-transmitting glass according to the present invention is suitable as a cover member for protecting a sensor part of an infrared sensor or an optical element, such as a lens for focusing infrared light on an infrared sensor part of the infrared sensor.

The invention claimed is:

1. An infrared-transmitting glass containing, in terms of % by mole, 21 to 40% Ge, over 0 to 40% Ga, 40 to 78% Te, 0 to 40% Si+Al+Ti+Cu+In+Sn+Bi+Cr+Sb+Zn+Mn+Cs+Ag+As+Pb, 0 to 40% F+Cl+Br+I, and being substantially free of As and S.

2. An optical element comprising the infrared-transmitting glass according to claim 1.

3. An infrared sensor comprising the optical element according to claim 2.

* * * * *